(12) United States Patent
Eng et al.

(10) Patent No.: US 8,904,380 B1
(45) Date of Patent: Dec. 2, 2014

(54) SOFTWARE INSTALLATION ON A MULTI-CHASSIS NETWORK DEVICE

(71) Applicant: Juniper Networks, Inc., Sunnyvale, CA (US)

(72) Inventors: Wing Eng, Ithaca, NY (US); Pallavi Mahajan, Ghaziabad (IN); Philip A. Shafer, Raleigh, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/758,568

(22) Filed: Feb. 4, 2013

Related U.S. Application Data (63) Continuation of application No. 12/825,675, filed on Jun. 29, 2010, now Pat. No. 8,370,831, which is a continuation of application No. 11/235,715, filed on Sep. 26, 2005, now Pat. No. 7,747,999.

(51) Int. Cl.
   *G06F 9/445* (2006.01)
   *H04L 12/28* (2006.01)

(52) U.S. Cl.
   CPC .................................. *G06F 8/61* (2013.01)
   USPC ............................ 717/178; 370/400

(58) Field of Classification Search
   None
   See application file for complete search history.

(56) References Cited

U.S. PATENT DOCUMENTS

| | | |
|---|---|---|
| 5,454,080 A | 9/1995 | Fasig et al. |
| 5,684,984 A | 11/1997 | Jones et al. |
| 5,848,227 A | 12/1998 | Sheu |
| 6,154,847 A | 11/2000 | Schofield et al. |
| 6,161,151 A | 12/2000 | Sudhakaran et al. |
| 6,205,502 B1 | 3/2001 | Endo et al. |
| 6,219,706 B1 | 4/2001 | Fan et al. |
| 6,253,266 B1 | 6/2001 | Ohanian |
| 6,285,679 B1 | 9/2001 | Dally et al. |
| 6,308,176 B1 | 10/2001 | Bagshaw |
| 6,370,145 B1 | 4/2002 | Dally et al. |
| 6,594,229 B1 | 7/2003 | Gregorat |
| 6,594,721 B1 | 7/2003 | Sakarda et al. |
| 6,597,689 B1 | 7/2003 | Chiu et al. |
| 6,618,805 B1 | 9/2003 | Kampe |
| 6,633,544 B1 | 10/2003 | Rexford et al. |
| 6,654,381 B2 | 11/2003 | Dally et al. |

(Continued)

OTHER PUBLICATIONS

"Juniper's TX Waits Its Turn," Light Reading, Sep. 27, 2004, 2 pgs.

(Continued)

*Primary Examiner* — Don Wong
*Assistant Examiner* — Erika Kretzmer
(74) *Attorney, Agent, or Firm* — Shumaker & Sieffert, P.A.

(57) ABSTRACT

A multi-chassis router allows an administrator to install software from a single user interface. The multi-chassis router automatically forwards the software to each chassis within the multi-chassis router when given a single command to install the software from an administrator. The multi-chassis router also automatically validates the software on each chassis. After reporting the results of the validations, the multi-chassis router may wait for the administrator to issue a commit command before committing each chassis within the multi-chassis router to the software. Alternatively, in response to a failed validation or for other reason, an administrator can issue a single ROLLBACK command. This allows each chassis within the multi-chassis router to have the same software during all stages of a software installation and ensures software on each chassis is compatible with software on every other chassis.

21 Claims, 7 Drawing Sheets

(56) References Cited

U.S. PATENT DOCUMENTS

| | | | |
|---|---|---|---|
| 6,671,694 B2 | 12/2003 | Baskins et al. | |
| 6,751,191 B1 | 6/2004 | Kanekar et al. | |
| 6,799,319 B2 | 9/2004 | Van Loo et al. | |
| 6,816,936 B1 | 11/2004 | Wu et al. | |
| 6,854,069 B2 | 2/2005 | Kampe et al. | |
| 6,865,737 B1 | 3/2005 | Lucas et al. | |
| 6,910,148 B1 | 6/2005 | Ho et al. | |
| 6,941,487 B1 | 9/2005 | Balakrishnan et al. | |
| 6,948,088 B1 | 9/2005 | Sharan | |
| 6,965,903 B1 | 11/2005 | Agarwal et al. | |
| 6,966,058 B2 * | 11/2005 | Earl et al. | 717/171 |
| 6,980,543 B1 | 12/2005 | Kastenholz et al. | |
| 6,981,173 B2 | 12/2005 | Ferguson et al. | |
| 6,983,317 B1 | 1/2006 | Bishop et al. | |
| 7,000,153 B2 | 2/2006 | Inagawa et al. | |
| 7,010,617 B2 | 3/2006 | Kampe et al. | |
| 7,046,683 B1 | 5/2006 | Zhao | |
| 7,054,924 B1 | 5/2006 | Harvey et al. | |
| 7,054,926 B1 | 5/2006 | Abidi et al. | |
| 7,061,858 B1 | 6/2006 | Di Benedetto et al. | |
| 7,069,354 B2 | 6/2006 | Pooni et al. | |
| 7,076,555 B1 | 7/2006 | Orman et al. | |
| 7,076,696 B1 | 7/2006 | Stringer | |
| 7,096,383 B2 | 8/2006 | Talaugon et al. | |
| 7,111,035 B2 | 9/2006 | McClellan et al. | |
| 7,117,311 B1 | 10/2006 | Rankin et al. | |
| 7,146,448 B2 | 12/2006 | Davies et al. | |
| 7,151,741 B1 | 12/2006 | Elliot et al. | |
| 7,154,902 B1 | 12/2006 | Sikdar | |
| 7,155,534 B1 | 12/2006 | Meseck et al. | |
| 7,159,017 B2 | 1/2007 | Oi et al. | |
| 7,162,737 B2 | 1/2007 | Syvanne et al. | |
| 7,164,676 B1 | 1/2007 | Chakraborty | |
| 7,167,479 B2 | 1/2007 | Christensen et al. | |
| 7,178,052 B2 | 2/2007 | Hebbar et al. | |
| 7,233,975 B1 | 6/2007 | Gerraty et al. | |
| 7,263,091 B1 | 8/2007 | Woo et al. | |
| 7,274,702 B2 | 9/2007 | Toutant et al. | |
| 7,277,018 B2 | 10/2007 | Reyes et al. | |
| 7,406,038 B1 | 7/2008 | Oelke et al. | |
| 7,411,925 B2 | 8/2008 | Nain et al. | |
| 7,430,735 B1 | 9/2008 | Balakrishnan et al. | |
| 7,461,374 B1 * | 12/2008 | Balint et al. | 717/174 |
| 7,518,986 B1 | 4/2009 | Chadalavada et al. | |
| 7,552,262 B1 | 6/2009 | Turner et al. | |
| 7,606,241 B1 | 10/2009 | Raghunathan et al. | |
| 7,747,999 B1 | 6/2010 | Eng et al. | |
| 7,804,769 B1 | 9/2010 | Tuplur et al. | |
| 7,899,930 B1 | 3/2011 | Turner et al. | |
| 8,040,902 B1 | 10/2011 | Raghunathan et al. | |
| 8,135,857 B1 * | 3/2012 | Eng et al. | 709/238 |
| 8,149,691 B1 | 4/2012 | Chadalavada | |
| 8,370,831 B1 * | 2/2013 | Eng et al. | 717/178 |
| 2001/0017863 A1 | 8/2001 | McMillian et al. | |
| 2002/0060986 A1 | 5/2002 | Fukushima et al. | |
| 2002/0103921 A1 | 8/2002 | Nair et al. | |
| 2002/0133400 A1 | 9/2002 | Terry et al. | |
| 2002/0147974 A1 | 10/2002 | Wookey | |
| 2002/0191619 A1 | 12/2002 | Shafer | |
| 2002/0198974 A1 | 12/2002 | Shafer | |
| 2003/0007493 A1 | 1/2003 | Oi et al. | |
| 2003/0084371 A1 | 5/2003 | Mongazon-Cazavet et al. | |
| 2003/0099247 A1 | 5/2003 | Toutant et al. | |
| 2003/0147376 A1 | 8/2003 | Coutinho et al. | |
| 2003/0179703 A1 | 9/2003 | Levy et al. | |
| 2003/0185226 A1 | 10/2003 | Tang et al. | |
| 2003/0200330 A1 | 10/2003 | Oelke et al. | |
| 2003/0217096 A1 | 11/2003 | McKelvie et al. | |
| 2003/0233648 A1 * | 12/2003 | Earl et al. | 717/176 |
| 2003/0235195 A1 | 12/2003 | Shenoy et al. | |
| 2004/0030766 A1 | 2/2004 | Witkowski | |
| 2004/0031030 A1 | 2/2004 | Kidder et al. | |
| 2004/0034871 A1 | 2/2004 | Lu et al. | |
| 2004/0042395 A1 | 3/2004 | Lu et al. | |
| 2004/0062196 A1 | 4/2004 | Gunner et al. | |
| 2004/0073646 A1 | 4/2004 | Cho et al. | |
| 2004/0078619 A1 | 4/2004 | Vasavada | |
| 2004/0078621 A1 | 4/2004 | Talaugon et al. | |
| 2004/0111578 A1 | 6/2004 | Goodman et al. | |
| 2004/0199808 A1 | 10/2004 | Freimuth et al. | |
| 2004/0230759 A1 | 11/2004 | Braun et al. | |
| 2005/0013308 A1 | 1/2005 | Wybenga et al. | |
| 2005/0041658 A1 | 2/2005 | Mayhew et al. | |
| 2005/0060413 A1 | 3/2005 | Oyadomari et al. | |
| 2005/0063308 A1 | 3/2005 | Wise et al. | |
| 2005/0175017 A1 | 8/2005 | Christensen et al. | |
| 2005/0216910 A1 | 9/2005 | Marchand | |
| 2005/0226144 A1 | 10/2005 | Okita | |
| 2005/0257213 A1 | 11/2005 | Chu et al. | |
| 2006/0007944 A1 | 1/2006 | Movassaghi et al. | |
| 2006/0039384 A1 | 2/2006 | Dontu et al. | |
| 2006/0056285 A1 | 3/2006 | Krajewski, III et al. | |
| 2006/0089985 A1 | 4/2006 | Poletto | |
| 2006/0101375 A1 | 5/2006 | Loughlin et al. | |
| 2006/0120342 A1 | 6/2006 | Christensen et al. | |
| 2006/0223466 A1 | 10/2006 | Behzad | |
| 2007/0006056 A1 | 1/2007 | Lehner et al. | |
| 2007/0019642 A1 | 1/2007 | Lu et al. | |
| 2008/0044181 A1 | 2/2008 | Sindhu | |
| 2008/0275975 A1 | 11/2008 | Pandey et al. | |
| 2011/0013508 A1 | 1/2011 | Tuplur et al. | |

OTHER PUBLICATIONS

"Boston See Party," Light Reading, Jul. 8, 2004, 2 pgs.
"Cisco CRS-1 24-Slot Fabric-Card Chassis," Data Sheet, Cisco Systems, retrieved May 9, 2007, 6 pgs.
Xiaozhe Zhang, "ARS: An Sychronization Algorithm Maintaining Single Image Among Nodes' Forwarding Tables of Clustered Router," Sep. 6, 2005, Springer Berlin/Heidelberg, vol. 3619/2005, pp. 752-761.
"T640 Routing Node and TX Matrix™ Platform: Architecture," White Paper, Juniper Networks, Inc., (Printed Mar. 3, 2005), 21 pgs.
"TX Matrix™ Platform: Hardware Components and Cable System," White Paper, Juniper Networks, Inc., (Printed Mar. 15, 2005), 12 pgs.
Gary Matthews and Richard Hendricks, "Chapter Four—Routing Matrix," JUNOS 7.0 Feature Guide, Juniper Networks, Inc., Oct. 6, 2004, pp. 197-241.
"TX Matrix Platform Migration Guide," Juniper Networks, Inc., Revision 3, Dec. 9, 2004, 65 pgs.
"Cisco Carrier Routing System," Cisco Systems, May 19, 2004, 12 pgs.
Avici Systems Press Release, "Avici Demonstrates Carrier Class System Scalability and Reliability of its Routing Platform," 1 page, Jun. 22, 2004.
Avici Systems Press Release, "Avici and Ciena Demonstrate Dynamic Bandwidth Provisioning Across Intelligent Optical Network," 1 page, Jun. 5, 2001.
Network World, "New ways of routing the Internet," 2 pages, Jan. 19, 1998.
The Yankee Group Report, "Core Competence: New Requirements for Core Routing," 8 pages, Apr. 2002.
Yue (Edward) Yao, "Scalability of a class of Switch Networks," Department of Engineering Mathematics, Dalhousie University, 8 pages, May 16-18, 2005.
Ruzzicka, Nancee, "Core Competence: New Requirements for Core Routing", Apr. 2002, Yankee Group Report, pp. 1-8.
Eng et al., U.S. Appl. No. 12/825,675, filed Jun. 29, 2010 entitled "Software Installation on a Multi-Chassis Network Device".

* cited by examiner

SOFTWARE INSTALLATION ON A MULTI-CHASSIS NETWORK DEVICE

This application is a continuation of U.S. application Ser. No. 12/825,675, filed Jun. 29, 2010, which is a continuation of U.S. application Ser. No. 11/235,715, filed Sep. 26, 2005, and issued as U.S. Pat. No. 7,747,999. The entire contents of both of these applications is incorporated by reference herein.

TECHNICAL FIELD

The invention relates to computer networks and, more particularly, to installing software in network devices.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Service providers, for example an Internet service provider, must meet increasing bandwidth demands. This requires service providers to continuously add, replace and upgrade routing equipment within their networks. Equipment replacement and upgrades can be a challenge for service providers. As networks expand, administrative time and costs required to manage routing equipment also increase. As a result, service providers continuously seek to reduce time and expense associated upgrading and managing network routing systems.

One way to meet increasing bandwidth needs is to use multi-chassis routers, routers in which multiple routing devices are physically coupled and configured to operate as a single routing node. Because multi-chassis routers combine resources of multiple routing devices, multi-chassis routers have much higher bandwidth capabilities than standalone routers. For example, the use of multi-chassis routers can simplify and improve routing on a service provider network by consolidating routing functions onto fewer routers. However, the individual configuration and management of each device of a multi-chassis router can be a significant challenge.

SUMMARY

The principles of the invention relate to computer network routers and, more particularly, to installing software onto a multi-chassis router. For example, according to an embodiment of the invention, an administrator issues a command to install software onto a multi-chassis router. The multi-chassis router receives the software and automatically distributes it to each of the plurality of chassis. Each chassis then performs an independent validation of the software and returns a result of the validation. In response to a successful validation from each chassis, the multi-chassis router may simultaneously commit each chassis to the installed software. In this example embodiment, the multi-chassis router may also report the results of the validations from each relevant chassis to an administrator. After reporting the results of the validations, the multi-chassis router may wait for the administrator to issue a commit command before committing each chassis within the multi-chassis router to the software.

In one embodiment, a method for installing software in a multi-chassis router includes receiving with a control node associated with the multi-chassis router a command to install software on the multi-chassis router, and automatically downloading the software from the control node to one of the plurality of chassis in response to the command. The multi-chassis router includes a plurality of chassis.

In another embodiment, a multi-chassis router includes a plurality of chassis and a control node coupled to the plurality of chassis by communication links. The control node receives a command to install software on the multi-chassis router, and automatically downloads the software to one of the plurality of chassis in response to the command.

In an embodiment, a computer-readable medium includes instructions that cause a programmable processor in a network device to receive a command to install software on a multi-chassis router, wherein the multi-chassis router includes a plurality of chassis and automatically download the software to one of the plurality of chassis without manual intervention in response to the command.

Embodiments of the invention may provide one or more advantages. For example, one or more embodiments of the invention reduce the complexity, time and expense required to administer multi-chassis routers. During a software installation, embodiments of the invention ensure software compatibility by validating the software within each chassis prior to committing any chassis to the software. Furthermore, each chassis within a multi-chassis router to can simultaneously commit to installed software, preventing intra-router conflicts due to mismatched software.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
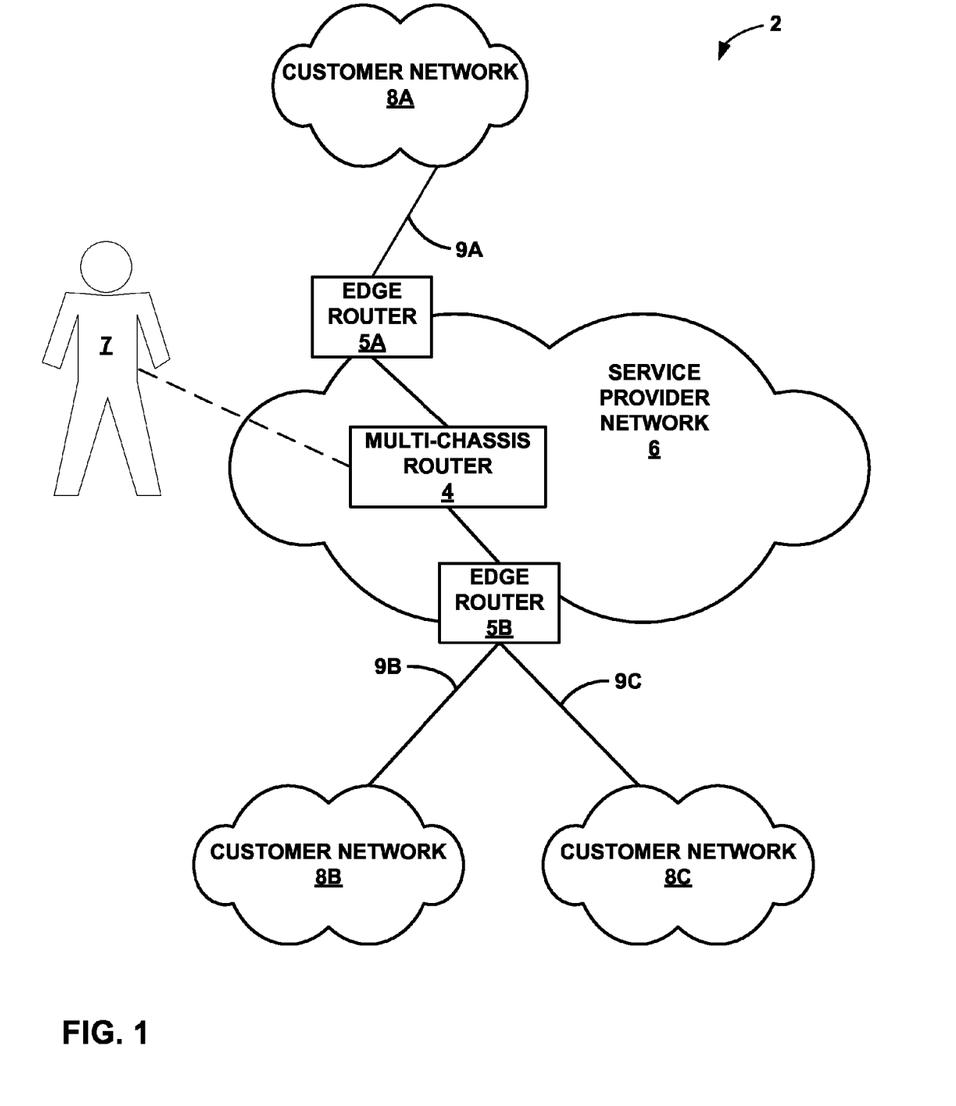
FIG. 1 is an example system in which a service-provider network includes a multi-chassis router.

FIG. 1 is a block diagram illustrating an example system 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. As described in further detail below, in one embodiment multi-chassis router 4 includes a switch card chassis (SCC) that operates as a control node and can include, for example, four line card chassis (LCCs) that operate as packet routing devices. The LCCs contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than multi-chassis router 4 and edge routers 5, such as additional routers, switches, servers, and the like.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Each of customer networks 8 may include one or more computing devices (not shown), such as personal computers, laptop computers, handheld computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Administrator 7 may control, query and monitor multi-chassis router 4 via a user interface, e.g., a command line interface (CLI), presented by multi-chassis router 4. Additionally, administrator 7 may interact with multi-chassis router 4 in other ways, such as a user interface presented by an administrative device (not shown in FIG. 1), which in turn communicates with multi-chassis router 4.

The user interface operates in accordance with a configuration syntax for a standalone router that has been extended to transparently provide and support multi-chassis router semantics. Specifically, the user interface supports a generalized command set of a standalone router to transparently configure and manage multi-chassis router 4. In this manner, the user interface provides a single point of configuration for the multiple routing devices operating within multi-chassis router 4. As a result, administrator 7 is able to interact with the user interface as if he or she is configuring a standalone router. The extended configuration syntax supported by the user interface allows administrator 7 to configure multi-chassis router 4 in an intuitive manner that is generally consistent with the administrator's previous interactions with standalone routers. The control node of multi-chassis router 4 automatically propagates commands and configuration data to each of the routing devices that form the multi-chassis router, and provides automated control over the distributed configuration process.

In a similar manner, the control node may provide a single point of interaction by which administrator 7 may install and update software on multi-chassis router 4. For example, the control node (e.g., the SCC) of multi-chassis router 4 provides a user interface by which administrator 7 uploads new or updated software. In turn, the control node manages a distributed installation process during which the software is installed on the individual routing devices that form multi-chassis router 4. Consequently, when installing and maintaining the routing protocols and other software executed by multi-chassis router 4, administrator 7 may interact with the multi-chassis router as if the router were a standalone router.

Figure 2:
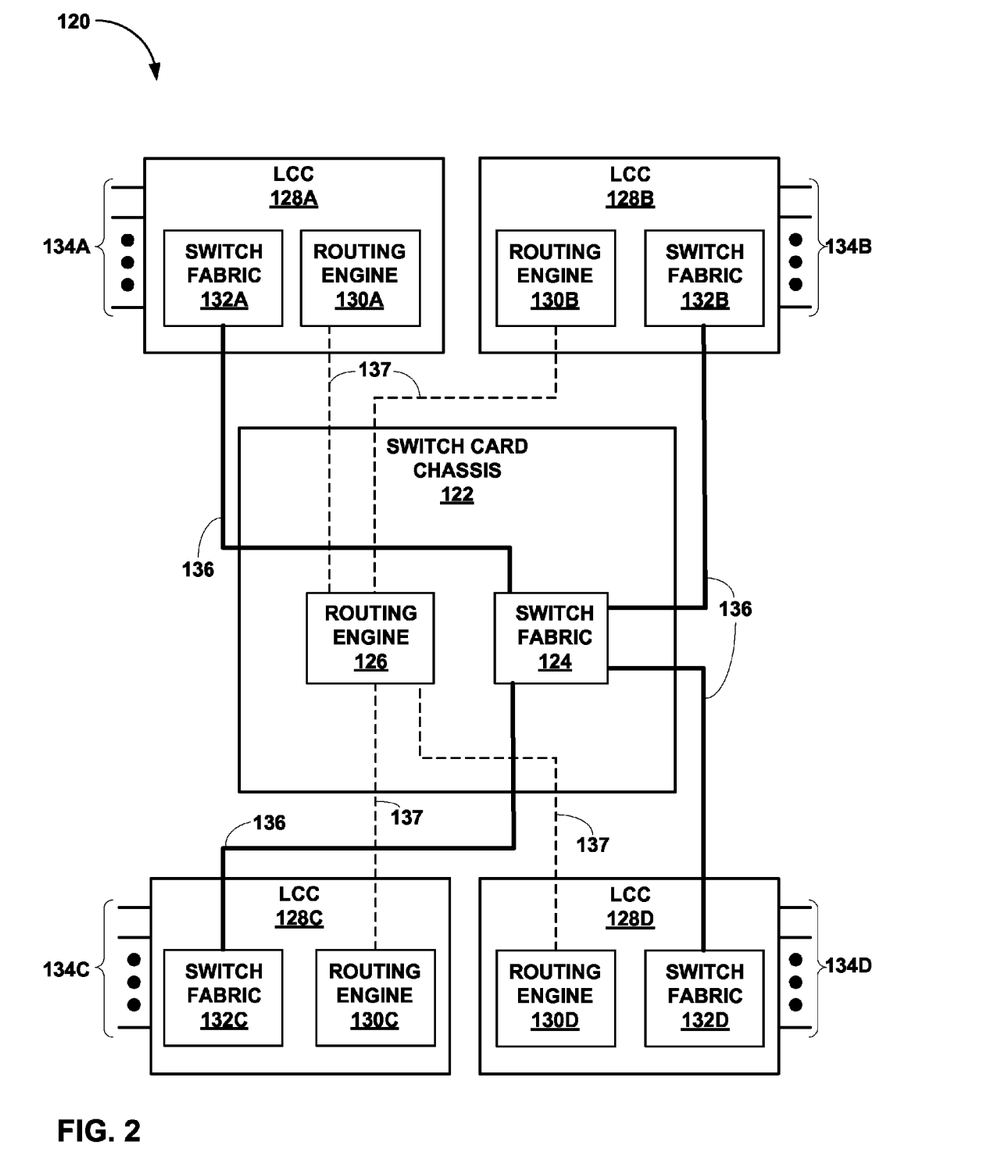
FIG. 2 is a block diagram illustrating an exemplary multi-chassis router that operates in accordance with the principles of the invention.

FIG. 2 is a block diagram illustrating an exemplary multi-chassis router 120 that operates consistent with the principles of the invention. In this example, multi-chassis router 120 comprises four substantially identical LCCs 128A-128D ("LCCs 128") and SCC 122.

SCC 122 comprises a centralized routing engine 126 and switch fabric 124. Each of LCCs 128 is contained within a physically separate chassis and includes one of LCC switch fabrics 132A-132D ("switch fabrics 132"), a set of network interface cards 134A-134D ("network interface cards 134") and one of routing engines 130A-130D ("routing engines 130"). The data plane in SCC 120 provides data flow paths between network interfaces 134 and includes LCC switch fabrics 132 and SCC switch fabric 124 linked by cables 136. The control plane in multi-chassis router 120 is physically separate from the data plane and includes LCC routing engines 130 coupled to SCC routing engine 126 by cables 137. Because the control plane in multi-chassis router 120 is physically separate from the data plane, the front-side bandwidth, i.e., the aggregate capacity of network interfaces 134, is preserved for data packet forwarding.

SCC 122 provides central control of multi-chassis router 120. Central control of multi-chassis router 120 is accomplished in part by using a centralized routing engine, SCC routing engine 126, which provides top-level routing management to multi-chassis router 120. Routing engine 126 serves as the control node of multi-chassis router 120. Routing engine 126 maintains routing information that describes a topology of a network, and derives a forwarding information base (FIB) in accordance with the routing information. Routing engine 126 controls packet forwarding throughout multi-chassis router 120 by installing a FIB in each of LCCs 128 via communication with routing engines 130 over cables 137. Because cables 137 provide a dedicated control plane connection between SCC 122 and LCCs 128, the FIB in each of LCC routing engines 130 is updated without interrupting packet forwarding performance of multi-chassis router 120.

In the illustrated embodiment, SCC 122 includes a single routing engine 126; likewise, each of LCCs 128 comprises a single routing engine 130. In other embodiments, SCC 122 and LCCs 128 may each comprise one or more back-up or active routing engines. Furthermore, a back-up routing engine in one of LCCs 128 or SCC 122 could operate as the primary routing engine for the other chassis within multi-chassis router 120. For example, a back-up routing engine in SCC 122 could serve as one of the primary routing engines 130. Because the control plane operates independently of the data plane, transferring to one or more back-up routing engines does not affect data plane operation.

SCC 122 not only directs data packets between LCCs 128, it also provides a central point of management, configuration and administration of multi-chassis router 120. For example, routing engine 126 of SCC 122 provides a user interface that operates in accordance with a configuration syntax for a standalone router that has been extended to transparently provide and support multi-chassis router semantics for configuration and general administration of LCCs 128.

As one example, a standalone router may include eight slots to receive network interface card concentrators, each network interface card concentrator having four slots to receive network interface cards. There may be, for example, eight network interface card concentrators numerically labeled 0:7. Individual network interface cards in a standalone router may be identified according to a network interface card concentrator number and a slot number, 0:3, within the specified network interface card concentrator. For example, one network interface card of a standalone router may be identified as network interface card concentrator 4, slot 2.

In order to extend this syntax to a multi-chassis router without adding an additional level to the identification hierarchy, network interface card concentrators may be labeled numerically as if they were physically contained in a single chassis. For example, assuming multi-chassis router 120 has four LCCs 128, each may include eight network interface card concentrators. This provides multi-chassis router 120 with a total of thirty-two network interface card concentrators, which may be labeled 0:31. As one example, one of the network interface cards in multi-chassis router 120 may be identified as network interface card concentrator 28, slot 0. As a result, the administrator need not specify the particular chassis on which the network interface concentrator or card resides. As demonstrated with this example, the syntax of a standalone router can be extended for use in a multi-chassis router.

The extended configuration syntax supported by routing engine 126 allows the administrator to provide configuration commands and data as if multi-chassis router 120 were a standalone router. SCC 122 invokes a distributed configuration process in which the commands and configuration data are propagated to each of LCCs 128 and any results or state information provided by the LCCs are compiled and presented to the administrator in a unified fashion.

In a similar manner, SCC 122 may provide a single point of interaction by which the administrator installs and updates software executing on the SCC and LCCs 128. Consequently, when installing and maintaining the routing protocols and other software executed by multi-chassis router 120, the administrator may interact with the multi-chassis router as if the router were a standalone router.

In other embodiments, multi-chassis router 120 may be controlled via an administrative device and/or remote connection, e.g., as described below with respect to FIG. 7.

Figure 3:
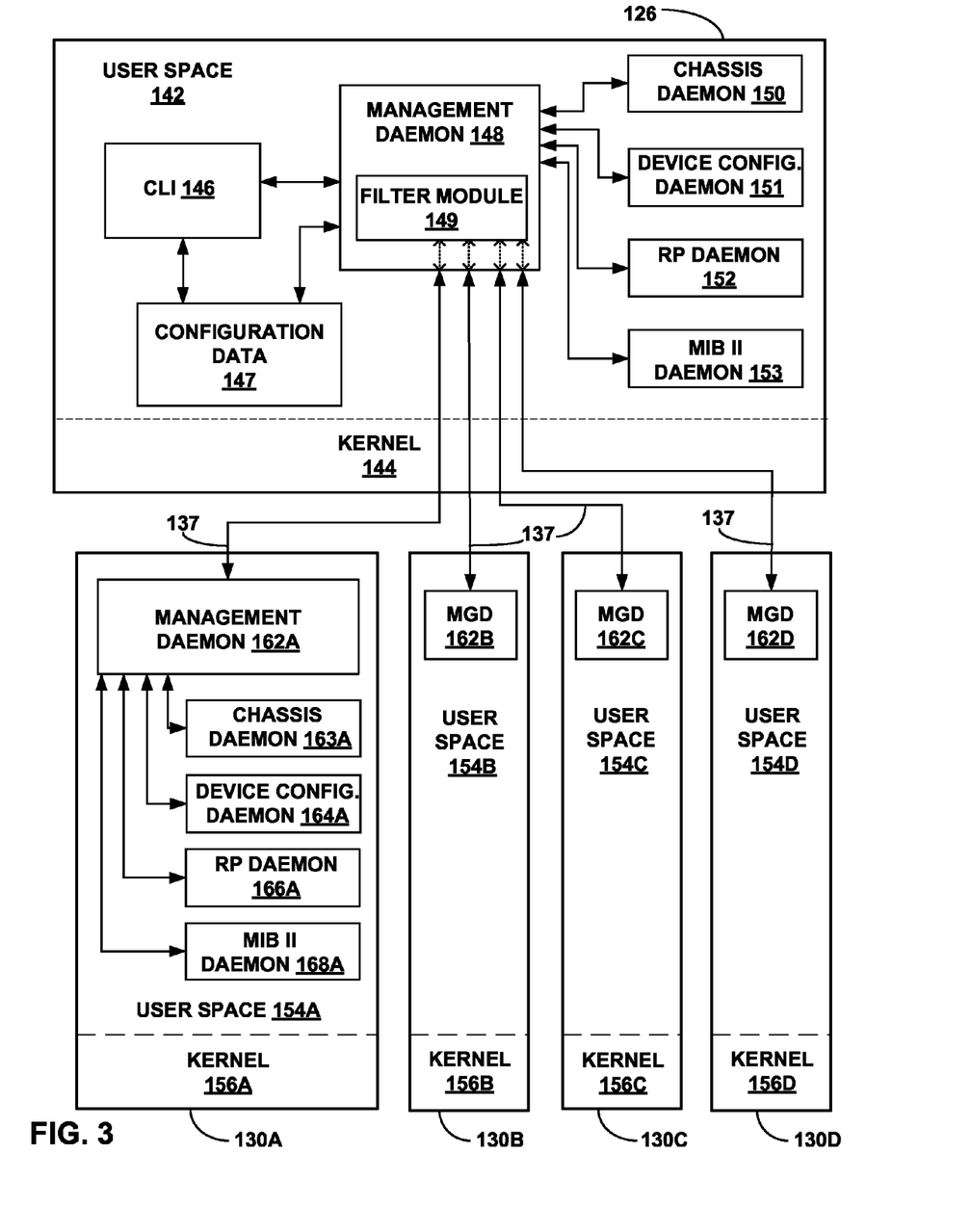
FIG. 3 is a block diagram illustrating an exemplary control plane of the multi-chassis router of FIG. 2 according to an embodiment of the invention.

FIG. 3 is a block diagram illustrating an example embodiment of the control plane of multi-chassis router 120 of FIG. 2 in further detail. In this example, the control plane includes SCC routing engine 126 connected to four LCC routing engines 130A-130D ("routing engines 130") via dedicated cables 137. Each of LCC routing engines 130 are substantially similar, but for simplicity LCC routing engine 130A is shown in more detail than LCC routing engines 130B-130D.

SCC routing engine 126 comprises user space 142 and kernel space 144. User space 142 includes software for presenting a command line interface (CLI) 146, a management daemon (MGD) 148, a chassis daemon (ChassisD) 150, device configuration daemon (DCD) 151, routing protocol daemon (RPD) 152 and management information base-II daemon (MIB-2D) 153. In embodiments, user space 142 may comprise other daemons or software modules.

In general, SCC routing engine 126 controls the operation of LCC routing engines 130. Each of LCC routing engines 130 provide an operating environment for a respective one of kernels 156A-156D ("kernels 156"). To ensure compatibility, kernels 156 may be substantially similar to kernel 144 in SCC routing engine 126. In other embodiments, kernels 156 and kernel 144 may be different types of operating systems or different versions of the same operating system. LCC routing engines 130 further comprise user spaces 154A-154D that provide an operating environment for user-level processes, such as MGDs 162A-162D ("MGDs 162"). Each of routing engines 130 may include other daemons or software modules, but for simplicity these are only shown on routing engine 130A. In this example, routing engine 130A includes ChassisD 163A, DCD 164A, RPD 166A and MIB-2D 168A.

An administrator may interact with multi-chassis router 140 via CLI 146 of SCC routing engine 126. For example, an administrator may use telnet or secure shell (SSH) protocol from a remote device to access SSC routing engine 126 and invoke CLI 146. In other embodiments, an administrator may communicate with multi-chassis router 120 via a separate administrative device, e.g., as described in the description of FIG. 7.

CLI 146 operates in accordance with a configuration syntax for a standalone router that is extended to transparently provide and support multi-chassis router semantics for configuration and general administration of LCCs 128. For example, CLI 146 and management daemon 148 responds to commands by automatically controlling the application of the commands to SCC 122 and LCCs 128 and compiling any responses to produce an integrated result for the administrator.

When an administrator issues a command at CLI 146, the command is first processed by MGD 148. If necessary, MGD 148 forwards the command to one or more of ChassisD 150, RPD 152, DCD 151 and/or MIB-2D 153. If the command requires, MGD 148 also forwards the command to one or more of MGDs 162 of LCC routing engines 130. A command forwarded to one or more of LCC routing engines 130 is processed in a similar manner as a command is processed in a standalone router. For example, a command received by LCC 128A is first processed by MGD 162A, which may then forward the command to one or more of ChassisD 163A, DCD 164A, RPD 166A and MIB-2D 168A. Furthermore, LCCs 128 may receive and process the same commands as standalone routers, i.e., in the manner the commands are presented to and processed by standalone routers.

For example, an administrator issues a SHOW CHASSIS HARDWARE command at CLI 146 in SCC routing engine 126, where it is received by MGD 148. MGD 148 determines the SHOW CHASSIS HARDWARE command requires a response from each of LCCs 128 and forwards the command to each of MGDs 162. Each of MGDs 162 forwards the command to a ChassisD, e.g., MGD 162A forwards the SHOW CHASSIS HARDWARE command to ChassisD 163A. Each ChassisD of LCCs 128 replies to the respective one of MGDs 162 with inventory and status information for the hardware of the corresponding LCC. MGDs 162 then forward their respective the hardware inventory and status information to MGD 148.

In addition, MGD 148 forwards the SHOW CHASSIS HARDWARE command to ChassisD 150 of SCC routing engine 126, which process the command and replies with an inventory and status information for the SCC 126.

MDG 148 compiles the inventory and status information from each of LCCs 128 with the inventory information for SCC 122, and presents the compiled information to the administrator via CLI 146 in an integrated form as if multi-chassis router 120 where a standalone router. The administrator receives the information in the compiled format, including the responses from each of LCCs 128 and SCC 122.

For example, the compiled format may number each network interface card within multi-chassis router 120 using sequential integers to label network interface card concentrators, e.g., 0:31, and slots of each of the network interface card concentrators, e.g., 0:3, without an indication of the particular chassis that contains each network interface card. In other embodiments, the compiled format of multi-chassis router 120's response may list the inventory of each chassis under a separate heading. For example, LCCs 128 may be labeled LCC0:LCC3 in the compiled format, and following each LCC label would be a list of the network interface cards, routing engines, switch cards, and other physical hardware present in that LCC. Likewise, the compiled format would include the physical elements of SCC 122. For example, physical hardware elements commonly contained within each chassis of a multi-chassis router not shown in FIG. 2 or 3, include, but are not limited to, routing engines, packet forwarding engines, cooling fans, memory and switch fabric card slots. These elements may also be individually labeled using sequential integers. Individual labels for each hardware element within multi-chassis router 120 allow an administrator to monitor, test and configure hardware elements within multi-chassis router 120 without regard to the physical location of the hardware elements.

Other commands may require MGD 148 to forward a request to any one or more of ChassisD 150, RPD 152, DCD 151, and MIB-2D 153. However, each administrator command is received via CLI 146 and processed by MGD 148. Then, depending on the particular command, MGD 148 may interrogate one or more of ChassisD 150, DCD 151, RPD 152, MIB-2D 153 and MGDs 162. MGD 148 receives and compiles responses from LCCs 128 and internal SCC responses and presents a system response to an administrator via CLI 146.

In this embodiment, routing engine 126 operates as the control node of multi-chassis router 120. In other embodiments, a control node including a user interface for administration of multi-chassis router 120 may be part of one of LCCs 128 or a separate administrative device. Some embodiments may have more than one control node.

In addition to supporting extended configuration syntax and integrated responses, the control plane of multi-chassis router 120 shown in FIG. 3 provides a single interface point that receives configuration data and automatically and transparently distributes the new configuration data to each chassis within multi-chassis router 120.

For example, SCC routing engine 126 may receive a new configuration file from the administrator and store the file within configuration data 147. MGD 148 then forwards the new configuration file to LCC MGDs 162 for validation. In this manner, SCC 122 can internally validate the configuration file in parallel with the validation performed by each of LCCs 128, thereby limiting the time required to reconfigure multi-chassis router 120. Once the configuration file has been validated by all chassis, MGD 148 informs the administrator that the new configuration file has been validated. An administrator may then issue a single COMMIT command, which MGD 148 transparently propagates to each MGD 162 as described previously in this section. Alternatively, in response to a failed validation or for other reason, an administrator can issue a single ROLLBACK command, in which case MGD 148 automatically cancels the configuration data issued to each chassis within multi-chassis router 120, and each chassis would retain its current configuration.

In one embodiment, a configuration file for multi-chassis router 120 may contain configuration data for every chassis of multi-chassis router 120 and, therefore, can be relatively large as compared to a configuration file for a standalone router. In general, validation of a new configuration file can require significant system resources, and commit times to update configuration files in multi-chassis router 120 can substantially exceed commit times in a standalone router. However, only a portion of a configuration file is relevant to the operation of LCCs 128, with the remaining portion being relevant to SCC 130. For example, interface configuration may be relevant to the operation of LCCs 128, while firewall configurations may be only relevant to the operation of SCC 122.

Accordingly, in some embodiments, prior to forwarding a new configuration file to LCC MGDs 162, filter module 149 in MGD 149 determines which portions of the configuration file are relevant to LCCs 128. Filter module 149 may uses metadata in the configuration database to decide which objects are relevant for LCCs 128. For example, metadata objects which are not relevant to LCCs 128 may be marked in the configuration file. Objects which are not relevant to LCCs 128 may include routing-options, protocols, policy-options, firewall, class-of-service and access. Only unmarked, and therefore presumably relevant, objects are included in a pruned configuration file. In an alternative embodiment, filter module 149 may select configuration data according to a list of metadata objects rather than looking for marked portions of configuration data. In either case, SCC MGD 148 sends only the pruned configuration file, which is much smaller than the entire configuration file, to each of LCCs 128.

While LCC MGDs 162 process only the pruned configuration file, SCC MGD 148 processes the new configuration file in its entirety. Alternatively, SCC MGD 148 may process only that portion relevant to SCC 122.

In addition, in order to decrease the time and system resources required to validate the new configuration file, MGD 148 may determine what objects changed between iterations of the configuration. For this process, only objects that changed from the previous configuration iteration are analyzed in more detail during validation. More detailed analysis may include, for example, validating the new configuration data corresponds to the physical hardware in multi-chassis router 120 and conforms to defined syntactical and semantic rules. Furthermore, only those objects that changed since the previous iteration are acted on by the relevant daemons. While LCC MGDs 162 only validate the pruned new configuration file, MGDs 162 may further decrease the time and resources required to validate the pruned file also by only acting on changed objects, just as MGD 148. Reducing the complexity and volume of configuration data for validation not only reduces commit times, but may also reduce or minimize any possible degradation in packet-forwarding functions of multi-chassis router 120 during the validation.

In addition, CLI 146 and SCC routing engine 126 may provide a single point of interaction by which the administrator installs and updates software executing on the SCC and LCCs 128. Consequently, when installing and maintaining the routing protocols and other software executed by multi-chassis router 120, the administrator may interact with the multi-chassis router as if the router were a standalone router.

For example, to perform a system-wide software installation an administrator may first download the new software onto SCC 122, e.g., using file transfer protocol (FTP) commands via CLI 146. MGD 148 automatically and transparently forwards the downloaded software to each of LCCs 128.

MGD 148 may forward the new software to each of LCCs 128 either serially or in parallel. Then SCC 122 and LCCs 128 each independently validate the software to be installed or updated. For example, validation of the new software may include checking syntax and or comparing the current configuration for compatibility with the new software. MGD 148 collects validation information from each of MGDs 162 and communicates the result of the validations to an administrator.

An administrator may then issue a single command to complete the installation of the new software on the various chassis. Alternatively, in response to a failed validation or for other reason, an administrator can issue a single command to cancel the software installation in each chassis. To install the software, MGDs 148 and 162 copy the downloaded software into active directories, e.g., a boot directory. Each of LCCs 128 and SCC 122 may then perform an in service software upgrade, loading the new software.

The above-described processes, including command-forwarding, configuration data propagation and software installation, involve a single interface (e.g., CLI 146) that provide a unified view to managing multi-chassis router 120 as if the router were a standalone router. In some embodiments, multi-chassis router 120 may also allow an administrator to selectively communicate directly with each chassis. For example, an administrator may communicate directly with LCC 128A to change configuration data only for LCC 128A. In other embodiments, an administrative device maybe able to communicate individually with each chassis or with multi-chassis router 120 in its entirety.

Figure 4:
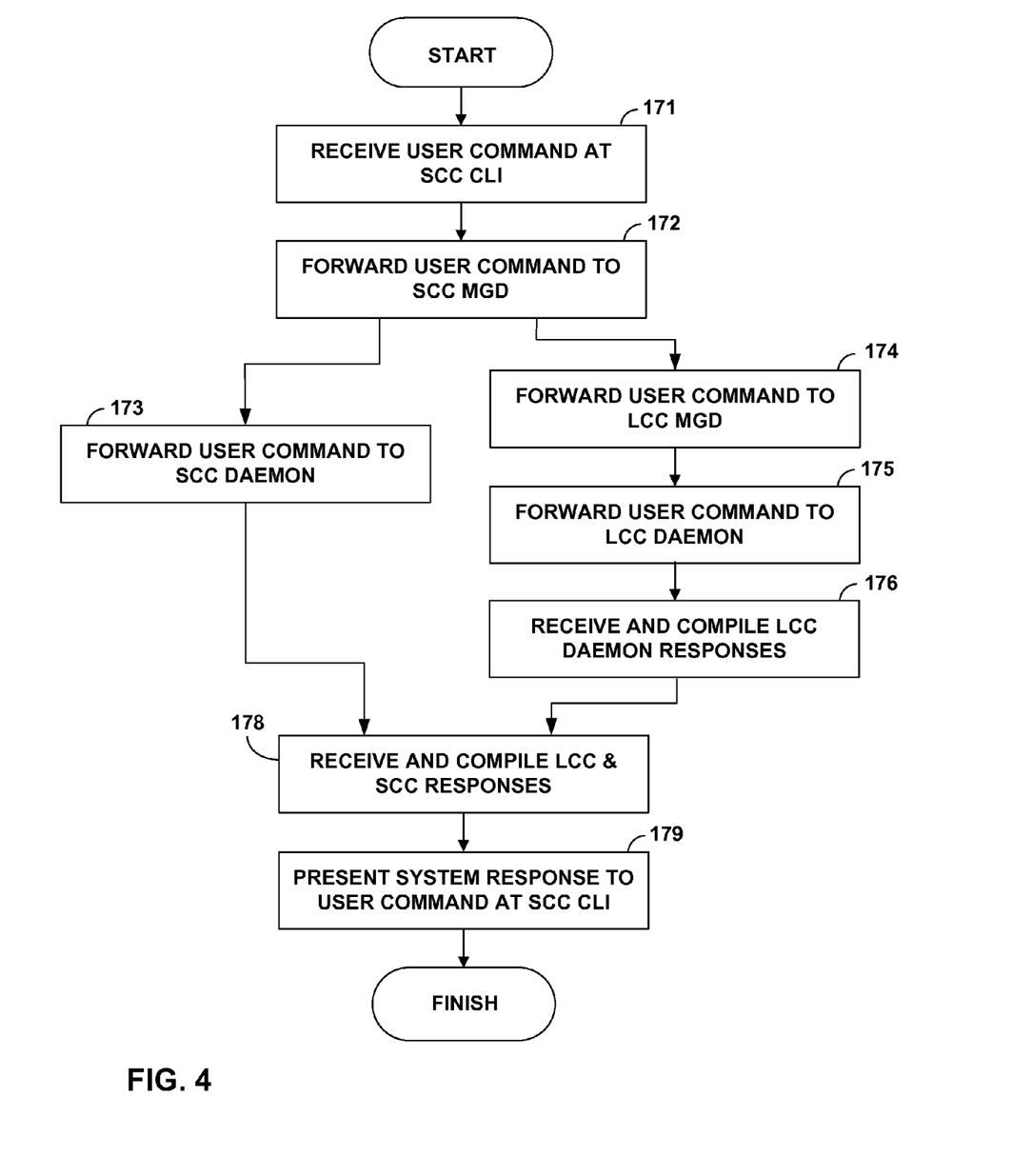
FIG. 4 is a flowchart illustrating exemplary operation the multi-chassis router when responding to a configuration command.

FIG. 4 is a flowchart illustrating exemplary operation of multi-chassis router 120 when responding to a command. For purposes of illustration, the flowchart will be described in reference to multi-chassis router 120 from FIG. 2 and the control plane of multi-chassis router 120 shown in FIG. 3.

Initially, an administrator inputs a command at CLI 146 of SCC routing engine 126 (171). For example, the command may comprise a SHOW CHASSIS HARDWARE command. MGD 148 of SCC routing engine 126 processes the command and forwards the request to the required daemons (172). For example, MGD 148 may forward the request to one or more of ChassisD 150, DCD 151, RPD 152, and MIB-2D 153 within SCC routing engine 126 (173) and/or to one or more of LCC routing engines 130 (174).

MGDs 162 of LCCs 128 process an administrator command received from MGD 148 and may forward the command to one or more daemons within LCC routing engines 130 (175). For example, MGD 162A may forward the request to one or more of ChassisD 163A, DCD 164A, RPD 166A, and MIB-2D 168A. MGDs 162 receive and compile responses including responses from daemons within LCC routing engines 130, if necessary (176). Next, MGD 148 receives responses from daemons within SCC routing engine 126, or one of routing engines 130, or any combination thereof (178). Regardless, MGD 148 compiles the LCC responses, if any, with the internal SCC response (178) and presents a system response to an administrator at CLI 146 (179).

For example, an administrator issues a "SHOW CHASSIS HARDWARE LCC 0" command. The command is consistent with single router syntax with the additional term "LCC 0," which restricts the command to a single LCC. In this case, assume LCC 0 corresponds to LCC 128A in FIG. 2. MGD 148 forwards the SHOW CHASSIS HARDWARE command to only LCC 128A (174). MGD 162A receives the command and forwards it to ChassisD 163A (175). ChassisD 163A responds to MGD 162A with an inventory of the hardware on LCC 128A. MGD 162A forwards this response to MGD 148 of SCC 122 (176). MGD 148 receives the response (178) and presents it to an administrator via CLI 146 (179).

In this manner, multi-chassis router 120 automatically recognizes, processes and responds to the same or similar commands as a standalone router. Thus, an administrator who operates both multi-chassis routers and standalone routers is only required to learn one set of commands. Further, the techniques may reduce the amount of time required to administer multi-chassis router 120 because an administrator can perform system-wide operations in a single step rather than repeating the operations for each chassis.

Figure 5:
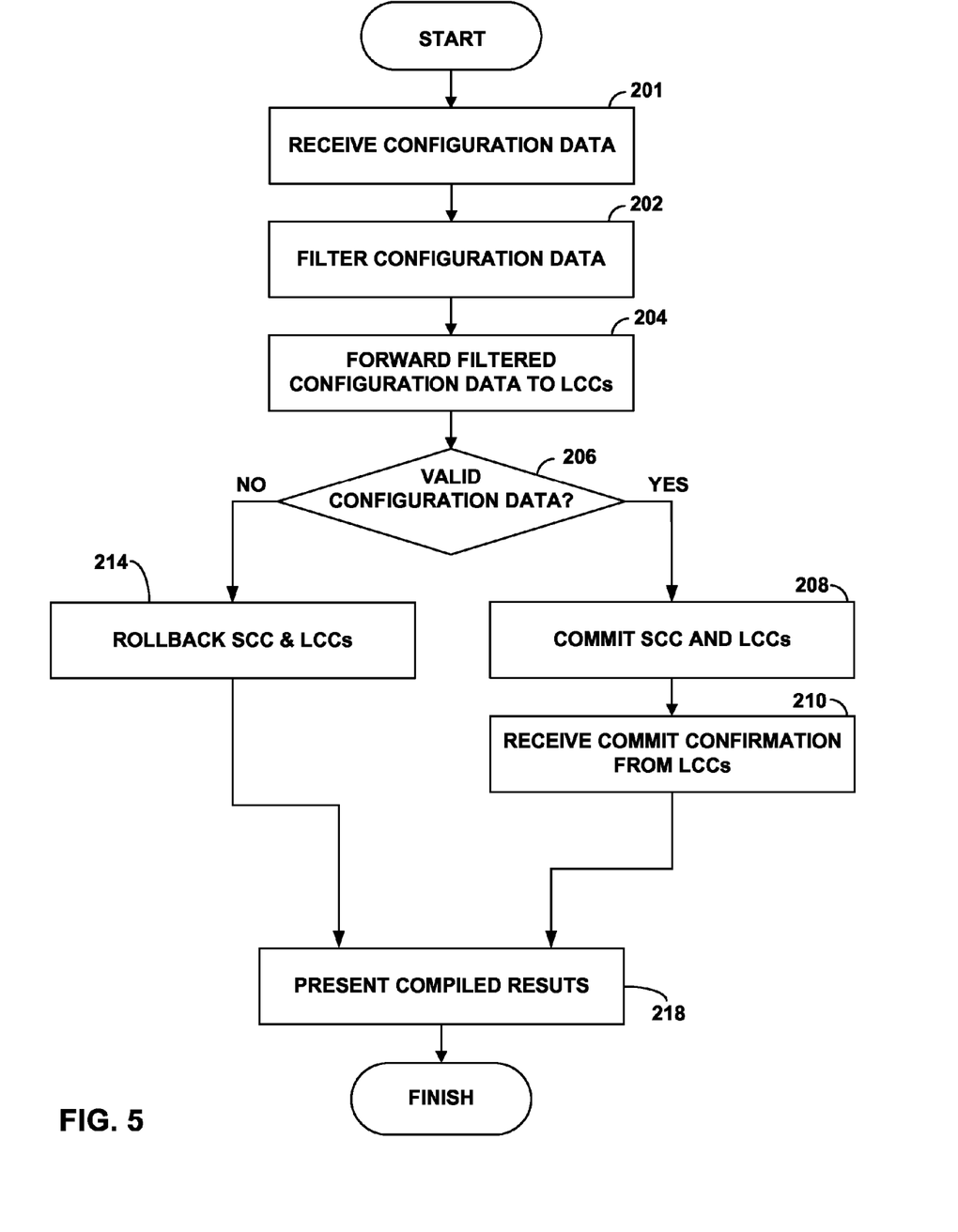
FIG. 5 is a flowchart further illustrating the multi-chassis router forwarding configuration to routing devices within the multi-chassis router.

FIG. 5 is a flowchart illustrating exemplary operation of multi-chassis router 120 when forwarding configuration data. Initially, SCC routing engine 126 receives a new configuration file from an administrator and stores it within configuration data 147 (201). In some embodiments, an administrator may deliver the configuration file via an administrative device, as shown in FIG. 7.

Next, filter module 149 of MGD 149 determines which portions of the configuration file are relevant to LCCs 128 (202). For example, filter module 149 may use a list of metadata objects to select portions of the new configuration file. Filter module 149 then forms a pruned configuration file, which includes only the selected configuration data, which is relevant to LCCs 128. SCC MGD 148 sends the pruned configuration file to each of LCCs 128 (204). For example, the new configuration file may be hundreds of kilobytes in size and the pruned configuration file sent to each of LCCs 128 may be less than half the size of the new configuration file. In some embodiments, LCCs 128 may receive identical sets of configuration data; in other embodiments, LCCs 128 may receive different sets of configuration data.

Next, MGDs 162 and 148 simultaneously validate the new configuration file (206). For example, validation of the new configuration file can include validating that the new configuration data corresponds to the physical hardware in multi-chassis router 120 and conforms to defined syntactical and semantic rules. Validating the new configuration file may include limiting complex processes of validation to new configuration data as described previously in the description of FIG. 4.

The result of the validation on all chassis is collected by MGD 148. In some embodiments, if the configuration data in each chassis is valid, MGD 148 will automatically issue a COMMIT command to each of LCCs 128 and to itself. In other embodiments, an administrator must enter the COMMIT command after receiving the validation results via CLI 146. In either case, LCC MGDs 162 commit the changes by copying the new pruned configuration file into an active directory and replacing the previous configuration data within a configuration database (208). MGD 148 also performs a commit operation by copying the new, unpruned configuration file into an active directory within configuration data 147 to replace the previous configuration data file. MGDs 162 each send a commit confirmation to SCC 122, where it is received by MGD 148 (210).

Alternatively, in response to a failed validation or for other reason, MGD 148 will automatically issue a ROLLBACK command to each of LCCs 128 and to itself (214). In other embodiments, an administrator must enter the ROLLBACK command after receiving the validation results via CLI 146 (214). The ROLLBACK command cancels the configuration data change and the previous configuration data remains in the active directory within each chassis. Each chassis within multi-chassis router 120 retains its current configuration.

After performing the commit or rollback, MGD 148 compiles the commit confirmation results or, alternatively, the rollback results from each chassis and presents these results to an administrator via CLI 146 (218).

The technique for distributing configuration data shown in FIG. 5 may be modified in different embodiments. For example, each chassis of a multi-chassis network device may receive a full set of configuration data. In such embodiments, filtering configuration data (202) is not required.

Figure 6:
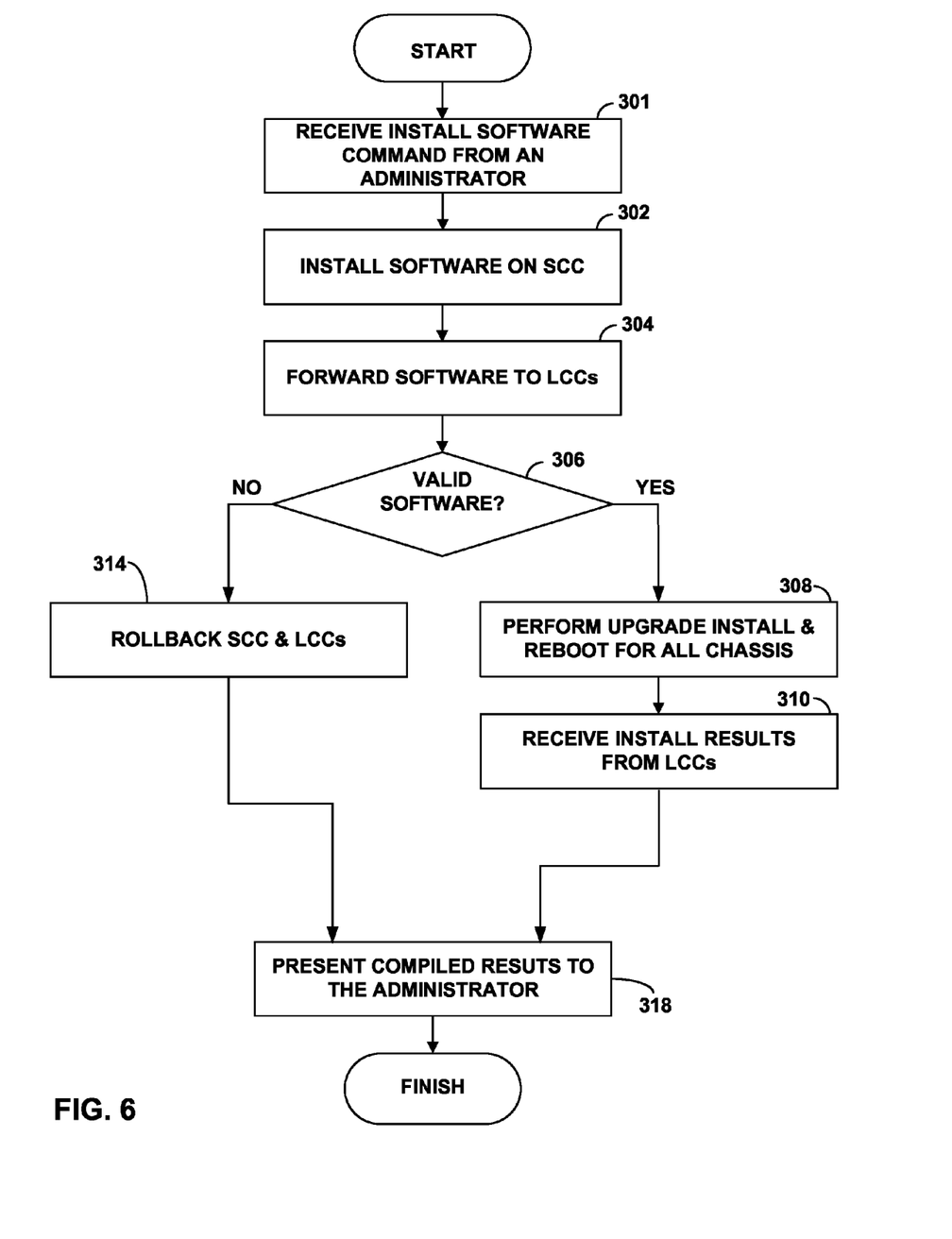
FIG. 6 is a flowchart illustrating exemplary operation of the multi-chassis router during installation of software.

FIG. 6 is a flowchart illustrating exemplary operation of multi-chassis router 120 when installing software. The administrator initiates the software installation, e.g., by issuing an install software command via CLI 146 or other suitable mechanism (301). In response, MGD 148 may download the new software onto SCC 122 (302), and forward all or part of the downloaded software to each of LCCs 128 (304). MGD 148 may forward the new software to each of LCCs 128 either serially or in parallel. Then SCC 122 and LCCs 128 independently validate the new software (306). For example, validation of the new software may include checking syntax and or comparing the current configuration for compatibility with the new software. MGD 148 collects validation information from each of MGS 162 and compiles a result (306). At this time MGD 148 may also communicate the result of the validations to an administrator.

If the software installation is valid, MGD 148 issues a single command to complete the installation of the new software (308). In other embodiments, an administrator is required to enter the command after receiving the validation results via CLI 146 (308). Upon receiving the command, MGDs 148 and 162 copy the downloaded software into active directories (308). For example, each of MGDs 148 and 162 may copy their copy of the new software into a boot directory. Each of LCCs 128 and SCC 122 may then perform an in service software upgrade, loading the new software (308).

Alternatively, in response to a failed validation or for other reason, MGD 148 may automatically issue a command to each of LCCs 128 to cancel the installation (314). In other embodiments, an administrator must enter the command after receiving the validation results via CLI 146 (314). The command cancels the installation, the previous software remains in the boot directory of each chassis and the chassis do not perform an in service software upgrade.

After performing the commit or rollback, MGD 148 compiles the commit confirmation results or, alternatively, the rollback results from each chassis and presents these results to an administrator via CLI 146 (318).

The technique for software installation shown in FIG. 6 may be modified in different embodiments. For example, each chassis of a multi-chassis network device may receive different software. With respect to multi-chassis router 120, for example, software for LCCs 128 may consist of a portion of the software for SCC 122. In other embodiments, some chassis may each receive entirely different software.

Figure 7:
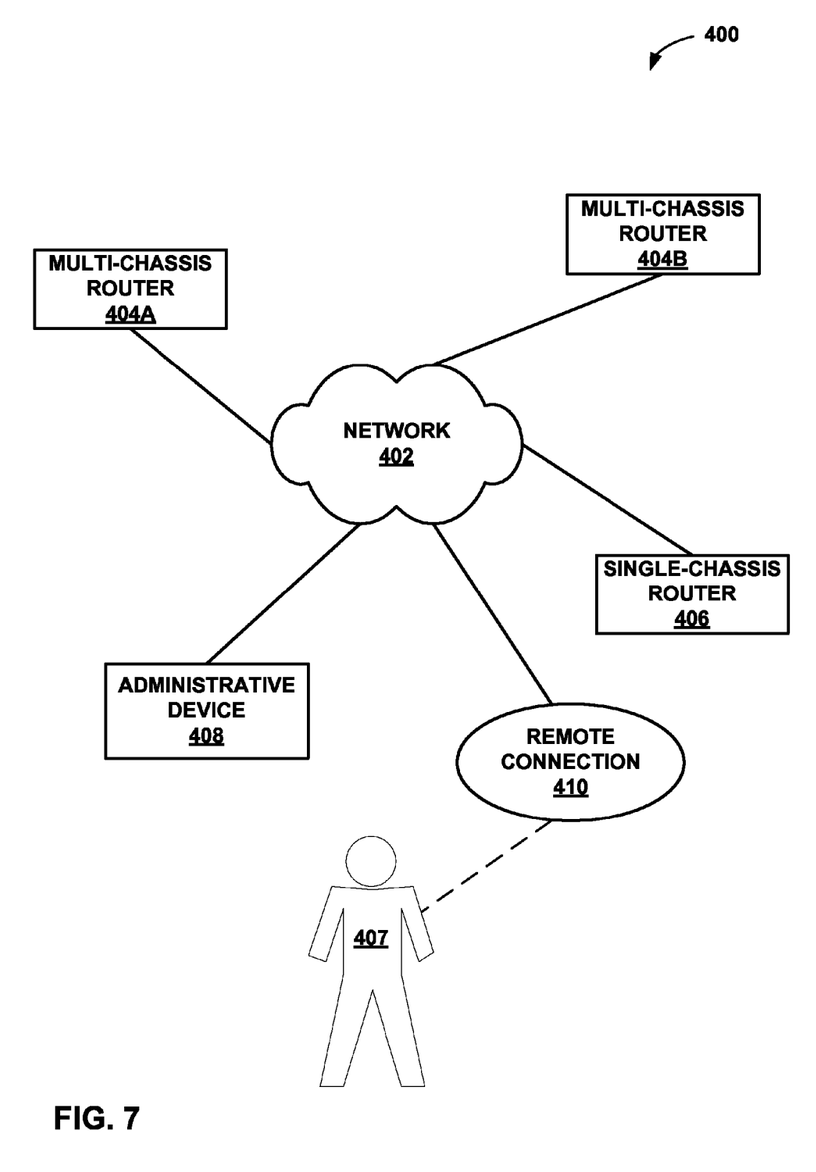
FIG. 7 is a block diagram illustrating an example a network having a multi-chassis router and an administrative control

FIG. 7 is an example system 400 comprising network 402 including administrative control device 408 allowing remote control of routers on network 402 according to an embodiment of the invention. Routers shown on network 402 include multi-chassis routers 404A and 404B ("multi-chassis routers 404") and standalone router 406. In other embodiments, there may be more or less routers controlled by administrative device 408 connected to network 402. Network 402 also includes remote connection 410, which allows administrator 407 to communicate with administrative device 408 via network 402. In other embodiments, administrator 407 may communicate directly with administrative device 408. Administrative device 408 can perform the administrative tasks performed by SCC 122 as described in the descriptions of FIGS. 2-6.

For example, administrative device 408 can receive commands from administrator 407 at remote connection 410 to control any of multi-chassis router 404 and/or standalone router 406. For example, remote connection 410 may be a telnet connection. Administrative device 408 can communicate directly with each chassis of multi-chassis routers 404, thereby reducing the administrative tasks which must be performed by the SCCs of multi-chassis routers 404. For example, administrative device 408 may store a copy of software to be installed on multi-chassis router 404A. Administrator 407 may issue an INSTALL SOFTWARE command via remote connection 410. In response, administrative device 408 would send the software directly to each chassis of multi-chassis router 404A. In this manner, the SCC of multi-chassis router 404A need not have to send a copy of the software to each LCC of multi-chassis router 404A. Furthermore, administrative device 408 may be able to send software to each chassis of multi-chassis router 404A simultaneously, resulting in a reduced commit time for the software installation compared to downloading software sequentially. In the same manner, configuration files and commands can be propagated from administrative device 408 to each chassis of multi-chassis routers 408.

Administrative device 408 may simplify the administration of multi-chassis routers 404 and standalone router 406. For example, administrator 407 only has to communicate with administrative device 408 rather than with each of multi-chassis routers 404 and standalone router 406 to operate each of multi-chassis routers 404 and standalone router 406. For example, an administrator may interact with administrative device 408 to install new operating system software on each of multi-chassis routers 404 and standalone router 406 with a single administrator command via remote connection 410 to administrative device 408.

Furthermore, administrative device 408 could contain multiple versions of operating software for multi-chassis routers 404 and standalone router 406. Administrator 407 could easily download, install and test new operating software on routers 404 and/or standalone router 406 and revert back to the old software version stored on administrative device 408. Administrative device 408 may also serve as a back-up of current configuration data and software for each of multi-chassis routers 404 and standalone router 406. As other examples of the administrative capabilities of administrative device 408, routing protocol or firewall settings may be changed for each of multi-chassis routers 404 and standalone router 406 by a single administrator command via remote connection 410 to administrative device 408.

The administrative capabilities of administrative device 408 are not limited to the examples given in this description. As one of ordinary skill in the art would understand, administrative device 408 may be used to control any facet of the operation of multi-chassis routers 404 and standalone router 406. For example, by communicating directly with each chassis within multi-chassis routers 404, administrative device 408 can perform the operations performed by MGD 184 as described in the description of FIGS. 3-6 including, but not limited to, command forwarding, configuration file pruning and forwarding and software installation.

A number of embodiments of the present invention have been described. Nevertheless, it will be understood that various modifications may be made without departing from the spirit and scope of the invention. Accordingly, other embodiments are within the scope of the following claims.

The invention claimed is:

1. A method for installing software in a multi-chassis router comprising:
   receiving with a control node associated with the multi-chassis router a command to install software on the multi-chassis router, wherein the multi-chassis router includes a plurality of chassis, wherein each of at least two of the plurality of chassis comprises a set of network interface cards and at least one of the plurality of chassis comprises a switch fabric for routing data among the network interface cards;
   automatically downloading the software from the control node to the plurality of chassis in response to the command;
   receiving a software validation result from each of the plurality of chassis after downloading the software from the control node to the plurality of chassis in response to the command; and
   after receiving the validation result from each of the plurality of chassis, either,
      in the event that each of the validation results received from the plurality of chassis are successful software validation results, sending a commit command to the plurality of chassis from the control node to commit the software on each of the plurality of chassis, or
      in the event that at least one of the validation results received from the plurality of chassis is a failed software validation result, sending a rollback command to the plurality of chassis to cancel the software installation.

2. The method of claim 1, further comprising outputting a compiled result representing the validation results from each of the plurality of chassis in accordance with a format of a standalone router.

3. The method of claim 1, wherein committing the plurality of chassis to the software comprises:
   moving the software into a directory of the plurality of chassis; and
   installing the software on each of the plurality of chassis.

4. The method of claim 1, further comprising:
   receiving a group of commit confirmations, wherein the group of commit confirmations includes a commit confirmation from each of the plurality of chassis; and
   producing a compiled response representing the group of commit confirmations.

5. The method of claim 1, wherein automatically downloading the software from the control node to the plurality of chassis in response to the command includes copying the software to each of the plurality of chassis sequentially.

6. The method of claim 1, wherein the method is performed by a management daemon included in a routing engine in a first chassis of the plurality of chassis.

7. The method of claim 1, wherein the method is performed by an administrative device, wherein the administrative device is connected to the multi-chassis router via a network.

8. The method of claim 1, further comprising receiving either the commit command or the rollback command from an administrator.

9. A multi-chassis router comprising:
   a plurality of chassis, wherein each of at least two of the plurality of chassis comprises a set of network interface cards and at least one of the plurality of chassis comprises a switch fabric for routing data among the network interface cards; and
   a control node coupled to the plurality of chassis by communication links; wherein the control node is configured to receive a command to install software on the multi-chassis router, and further configured to automatically download the software to the plurality of chassis in response to the command,
   wherein the control node is configured to receive a software validation result from each of the plurality of chassis after downloading the software from the control node to the plurality of chassis in response to the command,
   wherein the control node is configured to send a commit command to the plurality of chassis to commit the software in the event that a successful validation result is received from each of the chassis, and
   wherein the control node is further configured to send a rollback command to the plurality of chassis to cancel the software installation in the event that a failed software validation result is received from at least one of the plurality of chassis.

10. The multi-chassis router of claim 9, each of the plurality of chassis validates its respective portion of the software.

11. The multi-chassis router of claim 9, wherein the control node outputs a compiled result representing the validation results from each of the plurality of chassis in accordance with a format of a standalone router.

12. The multi-chassis router of claim 9, wherein, in response to the commit command from the control node, the plurality of chassis are each configured to:
   move the software into an active directory, and
   perform an in service software upgrade to install the software.

13. The multi-chassis router of claim 9, wherein the control node receives either the commit command or the rollback command from an administrator.

14. The multi-chassis router of claim 9, wherein the control node is within a routing engine in a first chassis of the plurality of chassis.

15. A non-transitory computer-readable medium comprising instructions that cause a programmable processor in a network device to:
   receive a command to install software on a multi-chassis router, wherein the multi-chassis router includes a plurality of chassis, wherein each of at least two of the plurality of chassis comprises a set of network interface cards and at least one of the plurality of chassis comprises a switch fabric for routing data among the network interface cards;
   automatically download the software to the plurality of chassis without manual intervention in response to the command;
   receive a software validation result from each of the plurality of chassis after downloading the software to the plurality of chassis in response to the command;
   after receiving the validation result from each of the plurality of chassis, in the event that a successful validation result is received from each of the plurality of chassis, send a commit command to the plurality of chassis to commit the software; and
   after receiving the validation result from each of the plurality of chassis, in the event that a failed software validation result is received from at least one of the plurality of chassis, send a rollback command to the plurality of chassis to cancel the software installation.

16. The computer-readable medium of claim 15, comprising further instructions that cause the each of the plurality of chassis to validate its respective portion of the software.

17. The computer-readable medium of claim 15, comprising further instructions that cause the programmable processor to output a compiled result representing the validation results from each of the plurality of chassis in accordance with a format of a standalone router.

18. The computer-readable medium of claim 15, comprising further instructions that cause the programmable processor to receive either the commit command or the rollback command from an administrator.

19. The computer-readable medium of claim 15, wherein the commit command comprises instructions that cause the programmable processor to:
   move the software into a directory in each of the plurality of chassis; and
   install the software on each of the plurality of chassis.

20. The computer-readable medium of claim 15, comprising further instructions that cause the programmable processor to:
   receive a group of commit confirmations, wherein the group of commit confirmations includes a commit confirmation from each of the plurality of chassis; and
   produce a compiled response representing the group of commit confirmations.

21. The multi-chassis router of claim 9, wherein the control node is configured to send the rollback command to each chassis of the plurality of chassis to cancel the software installation in the event that the failed software validation result is received from exactly one of the plurality of chassis.

* * * * *